United States Patent Office 2,995,565
Patented Aug. 8, 1961

2,995,565
PROCESS FOR THE MANUFACTURE OF CYCLIC ALDEHYDES
Ernst Jenny, Basel, Switzerland, assignor to Ciba Limited, Basel, Switzerland
No Drawing. Filed Aug. 19, 1957, Ser. No. 679,073
Claims priority, application Switzerland Aug. 27, 1956
14 Claims. (Cl. 260—310)

The present invention provides an advantageous process for the manufacture of cyclic aldehyde, wherein a cyclic compound containing a reactive hydrogen atom bound to a carbon atom is condensed with a dichloro-(dialkylamino)-methane with the splitting off of one molecule of hydrogen chloride, and the condensation product so obtained is treated with a hydrolysing agent.

The cyclic compound containing a reactive hydrogen atom, which is used as starting material, may, for example, belong to the aromatic, alicyclic or heterocyclic series. There is advantageously used a tertiary amino-aryl compound containing a reactive hydrogen atom, especially a free para-position, for example, a compound of the general formula (1)

wherein R may stand for a benzene or naphthalene radical containing a hydrogen atom in para position to the nitrogen atom, $A_1$ and $A_2$ may stand for identical or different, substituted or unsubstituted aliphatic groups, containing at the most four and preferably up to two carbon atoms in the aliphatic groups. Any substituents if present should be free from ionogenic properties.

Thus for example $A_1$ and $A_2$ may be benzyl groups or $A_1$ may be a methyl group and $A_2$ a formyl group.

A particularly useful group of starting materials are those corresponding to Formula 1, in which R is a benzene residue containing a hydrogen atom in para-position to the nitrogen atom and $A_1$ and $A_2$ are alkyl groups which may be substituted, or N, $A_1$ and $A_2$ together form a heterocyclic ring. Hydroxyl, alkoxy and cyano groups may be mentioned as examples of substituents in the alkyl group $A_1$ and/or $A_2$. The alkyl groups advantageously contain only few carbon atoms, as in the case of ethyl and methyl groups. Substituents, for example, halogen atoms or alkyl or alkoxy groups, may be present in the benzene residue R in ortho- or meta-position to the dialkyl amino group, which may itself contain substituents, or the benzene residue may be free from further substituents, in which case the amino-aryl compound is of the general formula (2)
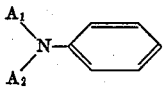

in which $A_1$ and $A_2$ have the meanings given above. As examples of amino-compounds with the Formula 2 there may be mentioned dimethylaminobenzene, diethylaminobenzene and N-methyl-N-β-cyanethylaminobenzene.

A further group of cyclic compounds containing a reactive hydrogen atom bound to a carbon atom to be used as starting materials is that having the ring system (3)
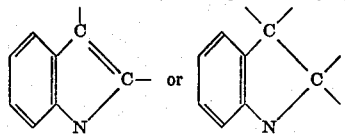

in which the two carbon atoms of the heterocyclic five-membered ring are connected by a double bond (indoles) or a single bond (indolines).

Among the indoles those unsubstituted in the 3-position there may be mentioned indole, 2-phenylindole, 1-methyl-2-phenylindole, 1-methyl-2-phenyl-6-nitroindole and 1:2-dimethylindole. In the process of this invention an aldehyde group is introduced into the 3-position of these compounds.

It is especially advantageous to introduce an aldehyde group into the $H_2C$-group in the 2-position of an N-substituted 3:3-dialkyl-2-methylene-indoline, especially a 1:3:3-trialkyl-2-methylene-indoline. These compounds may be substituted at the nitrogen atom (in 1-position), for example, by a benzyl group or another alkyl group, and the following compounds may be mentioned as examples, 1:3:3-trimethyl-2-methylene-indoline, 1:3:3-triethyl-2-methylene-indoline, 1-benzyl-3:3-dimethyl-2-methylene-indoline, 1:3:3-tributyl-2-methylene-indoline, 1:3:3-trimethyl-5-methoxy-2-methylene-indoline, 1:3:3-trimethyl-5-chloro-2-methylene-indoline, 1:3:3-trimethyl-2-methylene-indoline-5-carboxylic acid ethyl ester, and 4:5-benzo-1:3:3-trimethyl-2-methylene-indoline. Furthermore it is possible to introduce an aldehyde group in 4-position of a pyrazolone(-5) ring especially a 1-phenyl-3-methyl-pyrazolone(-5).

The other starting materials are dichloro-(dialkylamino)-methanes of the general formula (4)
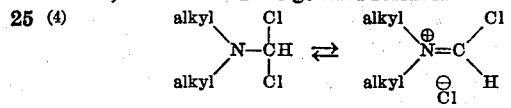

These compounds are new, and can be made by treating a dialkylformamide with phosgene. A dialkyl-formamide containing lower alkyl groups, such as diethylformamide or especially dimethylformamide, is advantageously used.

The treatment of the dialkylformamide with phosgene is advantageously carried out in an anhydrous inert organic solvent. Good results are obtained for example, with halogenated hydrocarbons such as monochlorobenzene, dichlorobenzene, tetrachlorethane, chloroform and especially carbon tetrachloride as solvents. When phosgene is introduced into such a solution of a dialkylformamide, the reaction takes place very easily. It is of advantage to work at about room temperature or a somewhat lower temperature, for example, within the range of 10° C. to 20° C.

It may be assumed that an addition product of phosgene and the dialkylformamide is formed in a first stage, and that from this product carbon dioxide is split off in a subsequent stage. Disregarding the intermediate addition product, the reaction may be represented as follows:

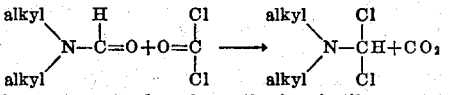

Accordingly 1 mol of carbon dioxide is liberated by the reaction of 1 mol of the dialkylformamide with 1 mol of phosgene, and this has been verified experimentally.

When the reaction is complete, the reaction mixture consists almost wholly of the solvent and the dichloro-(dialkylamino)-methane, which is generally suspended in the solvent. To obtain a dichloro-(dialkylamino)-methane which is sufficiently pure for most purposes, the solvent merely has to be distilled from the mixture as soon as the reaction has been completed.

In carrying out the process of this invention it is not necessary to separate the dichloro-(dialkylamino)-methane from the reaction mixture in which it was made. As a rule it is of advantage to add the compound, into which an aldehyde group is to be introduced, to the above mixture when the reaction between the dialkylformamide and phosgene is finished. Due to the good reactivity of dichloro-(dialkylamino)-methane the condensation starts immediately. For the purpose of obtaining a final product having a high degree of purity and in good yield the whole of the compound containing a reactive hydrogen atom should not be added at once, but gradually, and care should be taken that the reaction temperature does not rise too much, for example, not above 20° C., before the combination of the reaction components is complete. Subsequently the temperature may be raised, for example, to 50 to 70° C. to complete the reaction. During the condensation the components combine with one another in equimolecular proportions and one molecular proportion of hydrogen chloride is split off, for example, in accordance with the following equation:

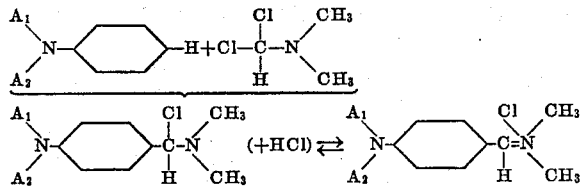

The condensation product so obtained is treated with a hydrolysis agent. For this purpose the reaction mixture, containing the condensation product, may be mixed with ice or ice-water, whereupon the condensation product generally first dissolves in the water and the splitting to form the aldehyde occurs subsequently. Alternatively the hydrolysis may be brought about by the addition of alkali, for example, an alkali metal hydroxide. The hydrolysis may be represented as follows:

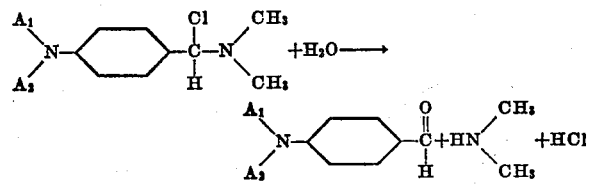

From the hydrochloride of the amino-aldehyde obtained by the action of water and usually dissolved in the water, the free base can be obtained in the usual manner by means of an alkali.

Many of the aldehydes which can be made according to the present process are known products for which there is a constant industrial demand.

As stated above, aldehydes are obtained by the process of this invention in good to very good yields and in a very advantageous manner. In this respect the process is superior to the known process described in German specification No. 677,207, in which an indole arylated or alkylated in the 2-position and unsubstituted in the 3-position, or an N-substituted indole containing in the 2-position a reactive methylene group and in the 3-position two alkyl groups, is reacted with a condensation product of phosgene with an N-formyl-compound of a secondary aromatic amine.

The following examples illustrate the invention, the parts and percentages being by weight unless otherwise stated and the relationship of parts by weight to parts by volume being the same as that of the kilogram to the liter.

Example 1

50 parts of phosgene were introduced at a temperature of 10 to 20° C. into a solution of 40 parts of dimethylformamide in 400 parts by volume of carbon tetrachloride, the solution being slightly cooled. Carbon dioxide was released, and dimethylamino-dichloro-methane was formed, and was precipitated as a white crystalline mass practically insoluble in carbon tetrachloride. When the whole phosgene had been introduced stirring was continued, until phosgene was no longer detectable, this being the case after about 30 minutes. The crystalline paste was then cooled to 10° C., and 80 parts by weight of N-methyl-N-β-cyanoethylaminobenzene were added dropwise. A bright yellow compound was gradually formed which probably has the general formula

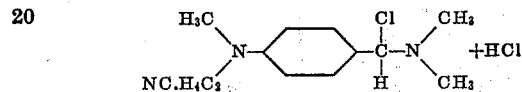

The mixture was stirred for one half hour at a temperature of 10 to 20° C., and to complete the reaction was slowly heated to a temperature of 50 to 55° C. At this temperature the yellow precipitated compound, insoluble in carbon tetrachloride melted to a yellowish brown, oily mass which after some time solidified to a bright yellow crumbly mass. The whole mixture was kept for 3 to 4 hours at a temperature of 50 to 55° C., and then it was poured into 800 parts of ice with 200 parts of water, the yellow aldehyde dissolving in the water, and the clear carbon tetrachloride, which collected at the bottom, was separated quantitatively. The aqueous solution having an acid reaction to Congo was neutralised, while stirring well, by slowly introducing 90 to 130 parts of a sodium hydroxide solution of 30 percent strength until addition of sodium hydroxide ceased to produce a whitish precipitate. The temperature was kept at about 15° and the pH value at 8 to 9. The separated aldehyde, which was initially oily, soon solidified to a yellow crumbly mass. The suspension was stirred to complete the precipitation (a clear, bright yellow supernatant solution), and the solidified mass was filtered off, washed with some cold water and dried in vacuum at 40 to 50° C. 4-(N-methyl-N-β-cyanethylamino)-benzaldehyde-(1) was obtained in a yield of about 85 parts, corresponding to about 90 percent of the theoretical value, and its melting point was 68 to 71° C.

In the following table are given in column II the chemical formulae and color of aldehydes which have been made by the procedure described above from the reaction product of phosgene and dimethylformamide and the amines given in column I.

| | I<br>Tertiary amine (starting material) | II<br>Aldehyde (final product) | III<br>Melting point of II | IV<br>Yield, percent |
|---|---|---|---|---|
| 1 | H₃C\N—⟨⟩<br>H₃C/ | H₃C\N—⟨⟩—CHO<br>H₃C/<br>bright yellow | 72 to 73° | 90 to 95 |
| 2 | H₅C₂\N—⟨⟩<br>H₅C₂/ | H₅C₂\N—⟨⟩—CHO<br>H₅C₂/<br>yellow-brown | Liquid | 95 |
| 3 | H₃C\N—⟨⟩<br>H₃C/   Cl | H₃C\N—⟨⟩—CHO<br>H₃C/   Cl<br>yellow-brown | 75 to 80° | 90 |

| | I<br>Tertiary amine (starting material) | II<br>Aldehyde (final product) | III<br>Melting point of II | IV<br>Yield, percent |
|---|---|---|---|---|
| 4 | (H₅C₂)₂N–C₆H₄–O–C₂H₅ | (H₅C₂)₂N–C₆H₃(O–C₂H₅)–CHO<br>dark brown | 73 to 76° | 95 |
| 5 | (H₅C₂)(H₃C–O–C₂H₄)N–C₆H₅ | (H₅C₂)(H₃C–O–C₂H₄)N–C₆H₄–CHO<br>brownish | Liquid | 90 |
| 6 | (HO–C₂H₄)(NC–C₂H₄)N–C₆H₅ | (HO–C₂H₄)(NC–C₂H₄)N–C₆H₄–CHO<br>red-brown | do | 75 |
| 7 | (H₅C₂)₂N–C₆H₄–CH₃ | (H₅C₂)₂N–C₆H₃(CH₃)–CHO<br>yellow-brown | do | 95 |
| 8 | (H₅C₂)₂N–C₆H₄–OH | (H₅C₂)₂N–C₆H₃(OH)–CHO<br>dark brown | | 60 |
| 9 | (H₃C)(HC(=O))N–C₆H₅ | (H₃C)(HC(=O))N–C₆H₄–CHO<br>yellow-brown | Liquid | 81 |
| 10 | H₃C–C(=O)–N(C₆H₅)–C(CH₃)=N | HC(=O)–C(C(=O)–N(C₆H₅)–C(CH₃)=N) H H<br>yellow | | 86 |
| 11 | (C₆H₅–CH₂)₂N–C₆H₅ | (C₆H₅–CH₂)₂N–C₆H₄–CHO<br>yellow | | 95 |
| 12 | (C₆H₅)(CH₃)N–C₆H₅ | (C₆H₅)(CH₃)N–C₆H₄–CHO<br>yellow-brown | Liquid | 95 |
| 13 | (H₃C)₂N–C₁₀H₇ | (H₃C)₂N–C₁₀H₆–CHO<br>yellow-brown | do | 86 |
| 14 | indole (HN, CH=CH, fused ring) | indole-CH–CHO<br>yellow | | 81 |

It is to be understood that the yield given in column IV is not the maximum yield obtainable by carefully looking for the best operating conditions but mostly the yield obtained in one trial on a laboratory scale.

*Example 2*

50 parts of phosgene were introduced at 10 to 15° C. into a mixture of 400 parts by volume of carbon tetrachloride and 41 parts of dimethylformamide. When phosgene could no longer be detected 86.5 parts of 1:3:3-trimethyl-2-methylene-indoline at 5 to 15° C. were slowly added. After stirring for about 2 hours, the temperature was slowly raised to about 40 to 50° C. If the heating is too rapid the reaction temperature will quickly rise to 60° C. with the formation of lumps. After 3 hours the reaction mass was poured, while stirring well, into 100 parts of ice and water, and the carbon tetrachloride layer was allowed to settle and was then separated. The aqueous layer was rendered alkaline with 130 parts of sodium hydroxide of 30 percent strength, whereby the aldehyde was hydrolysed with the splitting off of dimethylamine, which was removed by distillation with steam. Upon cooling, the aldehyde of the formula

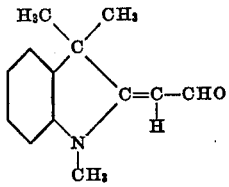

separated as a bright yellowish brown crumbly mass. The yield of the aldehyde melting at 112 to 115° C. was about 95 parts, corresponding to about 95 percent of the theoretical value.

The following examples illustrate slightly different procedural steps for products mentioned in the table of Example 1.

*Example 3*

Into a solution consisting of 40 parts of dimethylformamide and 600 parts of carbon tetrachloride which had been freed from traces of water, 51 parts of phosgene were introduced at 0° C. When no phosgene could be detected 89.5 parts of N-ethyl-N-methoxyethylamino benzene were added dropwise but fairly quickly. After ½ hours the mixture was heated to 50–55° C. and kept for 6 hours at that temperature. Then the whole was left to cool without stirring, the carbon tetrachloride was removed from the bottom and the residue was dissolved in water with the addition of ice. Sodium hydroxide solution was added until a distinctly alkaline reaction to mimosa paper was obtained, and the mixture was distilled with steam for a short time. Then the liquid aldehyde was separated from the supernatant water, washed with cold water and dehydrated in vacuo. The yield was 93 parts of 4-(N-ethyl-N-methoxyethylamino)benzaldehyde (-1).

*Example 4*

To a suspension in 640 parts of carbon tetrachloride of the dimethylamino - dichloro - methane formed from 40 parts of dimethylformamide and 51 parts of phosgene kept at 5–10° C., 61 parts of N-N-dimethylaniline were added slowly and while stirring well. Then the temperature was raised carefully to 45–50° C. and was kept several hours at that value. Then the carbon tetrachloride was slowly distilled off. The residue was dissolved in water with the addition of ice. First a clear solution was formed and afterwards hydrolysis occurred, and dimethylamino benzaldehyde separated out. The mixture was rendered alkaline and subjected to a steam distillation for a short time. After cooling down the mixture, the aldehyde was separated as a white precipitate in a yield of 63 parts and with a melting point of 70–73° C.

*Example 5*

50 parts of phosgene were introduced into a solution of 40 parts of dimethyl formamide in 600 parts of trichloroethylene kept at 0° C. Then 74.5 parts of diethylaniline were added at 10° C. dropwise but fairly quickly. After the reaction was finished the whole was heated to 70° C. and after some hours the trichloroethylene was removed from the bottom. The residue was dissolved in water with the addition of ice, 90 parts of a 30 percent sodium hydroxide solution were added and the mixture was distilled with steam for a short time. The resulting N-N-diethyl aminobenzaldehyde was obtained as an oil in almost quantitative yield.

What is claimed is:

1. A process for preparing cyclic aldehydes which comprises (1) condensing equimolar proportions of (a) an amine with a reactive hydrogen atom bound to a carbon atom, said amine being selected from the group consisting of aromatic, alicyclic and heterocyclic amines, and of (b) dichloro di-(lower)alkylamino methane, the condensation taking place at the carbon atom bound to the reactive hydrogen, whereby one mol of hydrogen chloride per mole of condensed amine is eliminated, and (2) hydrolyzing the intermediate compound thus formed.

2. A process for preparing cyclic aldehydes which comprises (1) condensing equimolar proportions of (a) tertiary aromatic amine, the position para to the tertiary amine group being free, and of (b) dichloro di-(lower) alkylamino methane, the condensation taking place at the carbon atom para to the tertiary amino group, whereby one mol of hydrogen chloride per mol of condensed tertiary aromatic amine is eliminated, and (2) hydrolyzing the intermediate compound thus formed.

3. A process for preparing cyclic aldehyde which comprises (1) condensing equimolar proportions of (a) a heterocyclic compound which consists essentially of a benzene ring and a fused-on heterocyclic ring, which heterocyclic ring consists of one nitrogen atom directly bound to the benzene ring and two carbon atoms completing a five-membered ring, said heterocyclic compound containing a reactive hydrogen atom bound to a carbon atom, and of (b) dichloro di-(lower)alkylamino methane, the condensation taking place at the carbon atom bound to the reactive hydrogen, whereby one mol of hydrogen chloride per mol of condensed heterocyclic compound is eliminated, and (2) hydrolyzing the intermediate compound thus formed.

4. A process for preparing cyclic aldehydes which comprises (1) condensing equimolar proportions of (a) a pyrazolone having an unsubstituted 4-position, and of (b) dichloro di-(lower)alkylamino methane, the condensation taking place at the unsubstituted 4-position, whereby one mol of hydrogen chloride per mol of condensed pyrazolone is eliminated, and (2) hydrolyzing the intermediate compound thus formed.

5. A process for preparing cyclic aldehydes which comprises (1) condensing equimolar proportions of (a) a 1-(di-aliphatically substituted) aminobenzene having an unsubstituted 4-position, the aliphatic groups of which contain at the most 4 carbon atoms, and of (b) dichloro di-(lower)alkylamino methane, the condensation taking place at the unsubstituted 4-position, whereby one mol of hydrogen chloride per mol of condensed 1-(di-aliphatically substituted) aminobenzene is eliminated, and (2) hydrolyzing the intermediate compound thus formed.

6. A process for preparing cyclic aldehydes which comprises (1) condensing equimolar proportions of (a) a 1-dialkylaminobenzene having an unsubstituted 4-position, the alkyl groups of said 1-dialkylaminobenzene containing at the most 2 carbon atoms, at least one of which alkyl groups being substituted by a substituent selected from the group consisting of hydroxyl, methoxy, cyano and phenyl, and of (b) dichloro di-(lower)alkylamino methane, the condensation taking place at the unsubstituted 4-position, whereby one mol of hydrogen chloride per mol of condensed 1-dialkylaminobenzene is eliminated, and (2) hydrolyzing the intermediate compound thus formed.

7. A process of preparing cyclic aldehydes which comprises (1) condensing equimolar proportions of (a) an indole having an unsubstituted 3-position, and of (b) dichloro di-(lower)alkylamino methane, the condensation taking place at the unsubstituted 3-position, whereby one mol of hydrogen chloride per mol of condensed indole is eliminated, and (2) hydrolyzing the intermediate compound thus formed.

8. A process for preparing cyclic aldehydes which comprises (1) condensing equimolar portion of (a) an indoline having a methylene group in the 2-position and of (b) dichloro di-(lower)alkylamino methane, the condensation taking place at the methylene group in the 2-position, whereby 1 mol of hydrogen chloride per mol of condensed indoline is eliminated, and (2) hydrolyzing the intermediate compound thus formed.

9. A process for preparing cyclic aldehydes which comprises: (1) contacting dialkylformamide with phosgene in an inert organic solvent, whereby reaction takes place with the elimination of carbon dioxide, (2) adding to the resulting product after the reaction is substantially over an amine with an active hydrogen atom bound to a carbon atom, said amine being selected from the group consisting of aromatic, alicyclic and heterocyclic amines, whereby condensation takes place between equimolar proportions of said amine and dichloro di-(lower alkylamino methane produced in step 1, the condensation taking place at the carbon atom bound to the reactive hydrogen, whereby 1 mol of hydrogen chloride per mol of condensed amine is eliminated, and (3) hydrolyzing the intermediate compound thus formed.

10. A process for preparing 4-(N-ethyl-N-methoxyethylamino)benzaldehyde(-1) which comprises: (1) contacting dimethylformamide with phosgene in an inert organic solvent to form dichloro-dimethylamino-methane, (2) adding N-ethyl-N-methoxyethylaminobenzene to the dichloro-dimethylamino-methane, (3) hydrolyzing in an aqueous medium the intermediate compound thus formed, and (4) recovering 4-(N-ethyl-N-methoxyethylamino)-benzaldehyde(-1) from the aqueous medium.

11. A process for preparing 4-(N:N-dimethylamino)-benzaldehyde(-1) which comprises: (1) contacting dimethylformamide with phosgene in an inert solvent to form dichlorodimethylamino-methane, (2) adding N:N-dimethylaminobenzene to the dichlorodimethylamino-methane, (3) hydrolyzing in an aqueous medium the intermediate compound thus formed, and (4) recovering 4-(N:N-dimethylamino)-benzaldehyde(-1) from the aqueous medium.

12. A process for preparing 4-(N:N-diethylamino)benzaldehyde(-1) which comprises: (1) contacting dimethylformamide with phosgene in an inert organic solvent to form dichlorodimethylamino-methane, (2) adding N:N-diethylaminobenzene to the dichlorodimethylamino-methane, (3) hydrolyzing in an aqueous medium the intermediate compound thus formed, and (4) recovering 4-(N:N-diethylamino)benzaldehyde(-1) from the aqueous medium.

13. A process for preparing 4-(N-methyl-N-β-cyanoethylamino)-benzaldehyde(-1) which comprises: (1) contacting dimehtylformamide with phosgene in an inert solvent to form dichloro-dimethylamino-methane, (2) adding N-methyl-N-β-cyanoethylaminobenzene to the dichlorodimethylamino-methane, (3) hydrolyzing in an aqueous medium the intermediate compound thus formed, and (4) recovering 4-(N-methyl-N-β-cyanoethylamino)-benzaldehyde(-1) from the aqueous medium.

14. A process for preparing the aldehyde of the formula

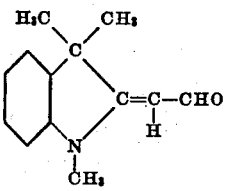

which comprises (1) contacting dimethylformamide with phosgene in an inert organic solvent to form dichloro-dimethylamino-methane, (2) adding 1:3:3-trimethyl-2-methylene-indoline to the dichloro-dimethylamino-methane, (3) hydrolyzing in an aqueous medium the intermediate compound thus formed, and (4) recovering the aldehyde of the formula

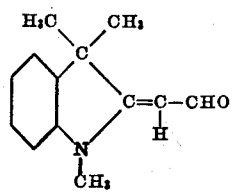

from the aqueous medium.

References Cited in the file of this patent

UNITED STATES PATENTS

| | | |
|---|---|---|
| 1,807,693 | Kalischer et al. | June 2, 1931 |
| 2,558,285 | Wilson | June 26, 1951 |

FOREIGN PATENTS

| | | |
|---|---|---|
| 135,948 | Switzerland | Dec. 16, 1929 |
| 677,207 | Germany | June 21, 1939 |
| 607,920 | Great Britain | Sept. 7, 1948 |

OTHER REFERENCES

"Org. Chemistry," Whitemore, 2nd ed., Van Nostrand Co., New York, p. 292 (1951).
Tyson et al.: JACS, vol. 74, pages 2273–4 (1952).
Campaigne: JACS, vol. 75, pages 989–990 (1953).
Houben: Sauerstoff-Verbindungen, II, Teil 1, Aldehyde (1954), George Thieme Verlag, Stuttgart, pp. 29–36.

UNITED STATES PATENT OFFICE
CERTIFICATE OF CORRECTION

Patent No. 2,995,565                                                     August 8, 1961

Ernst Jenny

It is hereby certified that error appears in the above numbered patent requiring correction and that the said Letters Patent should read as corrected below.

Columns 5 and 6, in the table, column 2 thereof and opposite item 14, the formula should appear as shown below instead of as in the patent:

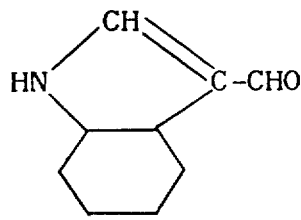

column 7, line 37, for "hours" read -- hour --; column 9, line 4, for "portion" read -- proportion --; column 10, line 2, for "dimehtylformamide" read -- dimethylformamide --.

Signed and sealed this 20th day of February 1962.

(SEAL)
Attest:
ERNEST W. SWIDER                                        DAVID L. LADD
Attesting Officer                                           Commissioner of Patents